(12) United States Patent
Hannuksela et al.

(10) Patent No.: US 8,767,818 B2
(45) Date of Patent: Jul. 1, 2014

(54) BACKWARD-COMPATIBLE AGGREGATION OF PICTURES IN SCALABLE VIDEO CODING

(75) Inventors: Miska Hannuksela, Ruutana (FI); Ye-Kui Wang, Tampere (FI)

(73) Assignee: Nokia Corporation, Espoo (FI)

( * ) Notice: Subject to any disclaimer, the term of this patent is extended or adjusted under 35 U.S.C. 154(b) by 1533 days.

(21) Appl. No.: 11/622,430

(22) Filed: Jan. 11, 2007

(65) Prior Publication Data

US 2007/0201549 A1 Aug. 30, 2007

Related U.S. Application Data

(60) Provisional application No. 60/758,254, filed on Jan. 11, 2006.

(51) Int. Cl.
*H04N 7/12* (2006.01)
*H04N 11/02* (2006.01)
*H04N 7/26* (2006.01)
*H04N 21/2662* (2011.01)
*H04N 21/63* (2011.01)
*H04N 21/2343* (2011.01)
*H04N 21/462* (2011.01)
*H04N 21/4402* (2011.01)
*H04L 29/06* (2006.01)
*H04N 21/6437* (2011.01)

(52) U.S. Cl.
CPC ..... *H04N 19/00454* (2013.01); *H04N 21/2662* (2013.01); *H04N 19/00321* (2013.01); *H04N 21/462* (2013.01); *H04N 21/631* (2013.01); *H04N 21/234327* (2013.01); *H04N 21/440227* (2013.01); *H04N 19/00327* (2013.01); *H04L 29/06489* (2013.01); *H04N 21/6437* (2013.01)
USPC ................................. 375/240.01; 375/240.16

(58) Field of Classification Search
CPC .................... H04N 7/26686; H04N 19/00321; H04N 19/00418; H04N 19/00424; H04N 19/00454; H04N 21/2662; H04N 21/462; H04N 21/631; H04N 21/234327; H04N 21/440227; H04N 19/00327; H04N 21/6437; H04L 29/06489; H04L 65/608; H04L 29/06517
USPC ......................................................... 375/240
See application file for complete search history.

(56) References Cited

U.S. PATENT DOCUMENTS 7,852,353 B1 * 12/2010 Haskell et al. ................. 345/629
2004/0017853 A1 * 1/2004 Garrido et al. ........... 375/240.16

(Continued)

FOREIGN PATENT DOCUMENTS

RU 2201654 C2 12/1997
WO WO 0103442 A1 1/2001

(Continued)

OTHER PUBLICATIONS

Wenger, Stephan, "H.264/AVC Over IP", IEE Transactions on Circuits and Systems for Video Technology, vol. 13, No. 7, pp. 645-656, Jul. 2003.

(Continued)

*Primary Examiner* — Sath V Perungavoor
*Assistant Examiner* — Xiaolan Xu
(74) *Attorney, Agent, or Firm* — Alston & Bird LLP

(57) ABSTRACT

An indirect aggregator NAL unit for the SVC file format and RTP payload format for video coding. The indirect aggregator NAL unit of the present invention enables easy identification of scalability dependencies within a bit stream, thereby enabling fast and efficient stream manipulation. Furthermore, the indirect aggregator NAL unit of the present invention ensures that a base layer of the streams can still be processed with a H.264/AVC decoder, AVC file format parser, and H.264/AVC RTP payload parser.

16 Claims, 3 Drawing Sheets

(56) References Cited

U.S. PATENT DOCUMENTS

| | | | |
|---|---|---|---|
| 2004/0028131 A1* | 2/2004 | Ye et al. | 375/240.11 |
| 2005/0201471 A1 | 9/2005 | Hannuksela et al. | |
| 2006/0156363 A1* | 7/2006 | Wu et al. | 725/113 |

FOREIGN PATENT DOCUMENTS

| | | |
|---|---|---|
| WO | WO-2004/036916 | 4/2004 |
| WO | WO 2005/079070 | 8/2005 |
| WO | WO 2005/112464 A1 | 11/2005 |
| WO | WO 2006/074851 A1 | 7/2006 |
| WO | WO 2006/123231 | 11/2006 |
| WO | WO 2007/009849 A1 | 1/2007 |
| WO | WO 2007/011836 A2 | 1/2007 |

OTHER PUBLICATIONS

Wenger, S. et al., "RTP Payload Format for H.264 Video", Memo-Internet Draft, Feb. 2004.

"H.264 n MPEG-4-," Russian Reference, 2005.

English translation of Office Action in Korean Application No. 10-2008-7019301, Aug. 11, 2010.

Supplementary European Search Report for EP Application EP 07705424, Oct. 10, 2010.

"VM Study Text for Scalable Video Coding (SVC) File Format", International Organization for Standardization, MPEG-4/Systems.

Allowance in Russian Application No. 2008128293, dated Jun. 11, 2010.

International Search Report for PCT Application PCT/IB2007/000075.

Argyriou, A., et al. "Streaming H.264/AVC Video over the Internet." Consumer Communications and Networking Conference, 2004, pp. 169-174.

Wenger, S., et al. "RTP Payload Format for SVC Video." Oct. 2005, pp. 1-14.

Singer, D, et al.; "*On the SVC File Format VM*;" International Organisation for Standardisation, Organisation Internationale de Normalisation—ISO/ISE/JTC1/SC29/WG11—Coding of Moving Pictures and Audio; dated Oct. 2005.

Office Action for Taiwanese Application No. 096101060; dated Aug. 8, 2013.

Search Report for R.O.C. Application No. 96101060 dated Dec. 22, 2012.

Decision of Grant for Japanese Application No. 2008-549947, dated Oct. 19, 2011.

\* cited by examiner

BACKWARD-COMPATIBLE AGGREGATION OF PICTURES IN SCALABLE VIDEO CODING

FIELD OF THE INVENTION

The present invention relates generally video coding. More particularly, the present invention relates the coding, storage and transport of scalable video.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Scalable Video Coding (SVC) provides scalable video bitstreams. A scalable video bitstream contains a non-scalable base layer and one or more enhancement layers. An enhancement layer may enhance the temporal resolution (i.e. the frame rate), the spatial resolution, or the quality of the video content represented by the lower layer or part thereof. The scalable layers can be aggregated to a single real-time transport protocol (RTP) stream or transported independently.

The concept of a video coding layer (VCL) and network abstraction layer (NAL) is inherited from advanced video coding (AVC). The VCL contains the signal processing functionality of the codec; mechanisms such as transform, quantization, motion-compensated prediction, loop filter, inter-layer prediction. A coded picture of a base or enhancement layer consists of one or more slices. The NAL encapsulates each slice generated by the VCL into one or more NAL units.

Each SVC layer is formed by NAL units, representing the coded video bits of the layer. An RTP stream carrying only one layer would carry NAL units belonging to that layer only. An RTP stream carrying a complete scalable video bit stream would carry NAL units of a base layer and one or more enhancement layers. SVC specifies the decoding order of these NAL units.

The concept of scaling the visual content quality by omitting the transport and decoding of entire enhancement layers is denoted as coarse-grained scalability (CGS).

In some cases, the bit rate of a given enhancement layer can be reduced by truncating bits from individual NAL units. Truncation leads to a graceful degradation of the video quality of the reproduced enhancement layer. This concept is known as fine-grained (granularity) scalability (FGS).

According to the H.264/AVC video coding standard, an access unit comprises one primary coded picture. In some systems, detection of access unit boundaries can be simplified by inserting an access unit delimiter NAL unit into the bitstream. In SVC, an access unit may comprise multiple primary coded pictures, but at most one picture per each unique combination of dependency_id, temporal_level, and quality_level.

Scalable video coding involves the encoding of a "base layer" with some minimal quality, as well as the encoding of enhancement information that increases the quality up to a maximum level. The base layer of SVC streams is typically advanced video coding (AVC)-compliant. In other words, AVC decoders can decode the base layer of an SVC stream and ignore SVC-specific data. This feature has been realized by specifying coded slice NAL unit types that are specific to SVC, were reserved for future use in AVC, and must be skipped according to the AVC specification.

The identification of pictures and their scalability characteristics within an SVC access unit is important at least for two purposes. First, this identification is important for compressed-domain stream thinning in servers or gateways. Due to the requirement to handle large amounts of data, these elements have to identify removable pictures as quickly as possible. Second, this identification is important for the playback of a stream with desired quality and complexity. Receivers and players should be able to identify those pictures in a scalable stream that they are incapable or unwilling to decode.

One function of media-aware gateways or RTP mixers (which may be multipoint conference control units, gateways between circuit-switched and packet-switched video telephony, push-to-talk over cellular (PoC) servers, IP encapsulators in digital video broadcasting-handheld (DVB-H) systems, or set-top boxes that forward broadcast transmissions locally to home wireless networks, for example) is to control the bit rate of the forwarded stream according to prevailing downlink network conditions. It is desirable to control the forwarded data rate without extensive processing of the incoming data, e.g., by simply dropping packets or easily identified parts of packets. For layered coding, gateways should drop entire pictures or picture sequences that do not affect the decoding of the forwarded stream. The interleaved packetization mode of the H.264/AVC RTP payload specification allows for the encapsulation of practically any NAL units of any access units into the same RTP payload (referred to as an aggregation packet). In particular, it is not required to encapsulate entire coded pictures in one RTP payload, but rather the NAL units of a coded picture can be split into multiple RTP packets.

While this liberty of packet aggregation is welcome for many applications, it causes a number of complications in a gateway operation. First, given an aggregation packet, it is not known to which pictures its NAL units belong to before parsing the header of each NAL unit contained in the aggregation packet. Therefore, when the interleaved packetization mode is applied for SVC, the layers in which the contained NAL units belong are not known before parsing the header of each NAL unit in the packet. Consequently, a gateway has to parse each NAL unit header before deciding whether any, all, or some NAL units of the packet are forwarded. Second, for some NAL units, such as Supplemental Enhancement Information (SEI) and parameter-set NAL units, it is not possible to identify the access unit they belong to before video coding layer (VCL) NAL units of the same access unit are received. Therefore, the gateway may need to maintain a buffer and some state information to resolve the mapping of non-VCL NAL units to their associated pictures.

In conventional video coding standards, a picture header is used to separate coded pictures. However, in the H.264/AVC standard and in SVC, no picture header is included in the syntax. Additionally, although parsers may have the ability to parse the scalability information for each NAL unit in a stream, this requires a bit larger amount of processing power, and some parsers may not have this ability.

In addition to the above, an aggregator NAL unit has been previously proposed in the SVC file format verification model 2 (MPEG document M7586). In this system, the aggregator NAL unit is a container that includes the associated NAL units in its payload. The aggregator NAL unit has a type that is unspecified in the H.264/AVC and SVC specifications and must be ignored in H.264/AVC and SVC decoders. However, when a base layer picture according to the H.264/AVC standard is enclosed within an aggregator NAL unit, it no longer is decodable with an H.264/AVC decoder, nor is it parsable with a H.264/AVC RTP depayloadizer or AVC file format parser.

SUMMARY OF THE INVENTION

The present invention provides for an indirect aggregator NAL unit for the SVC file format and RTP payload format. The indirect aggregator NAL unit of the present invention enables easy identification of scalability dependencies within the bitstream, thereby enabling fast and efficient stream manipulation. Furthermore, the indirect aggregator NAL unit of the present invention ensures that the base layer of the streams can still be processed with a H.264/AVC decoder, AVC file format parser, and H.264/AVC RTP payload parser.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
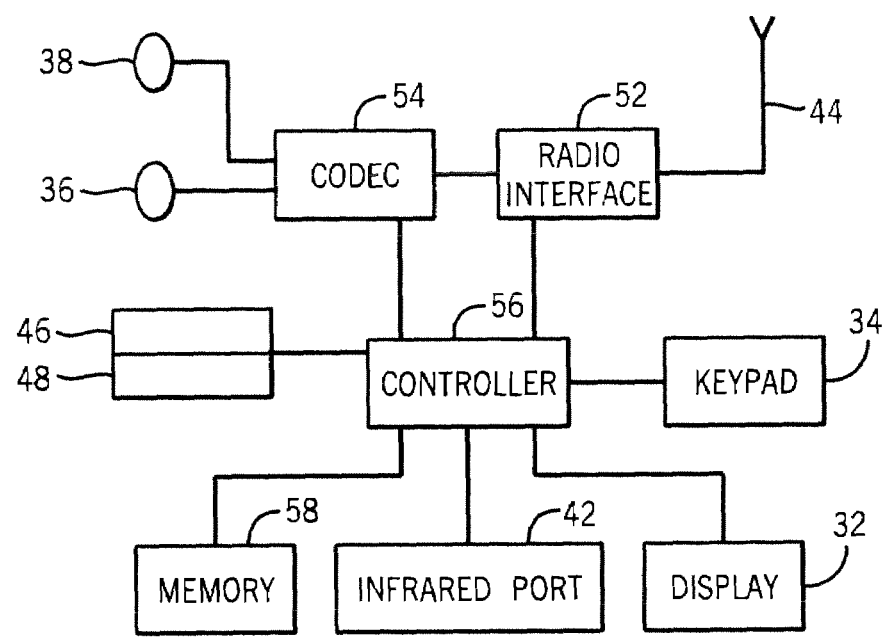
FIG. 1 is a schematic representation of the circuitry included in an electronic device that is capable of serving as an encoder or decoder to implement the functionality of the present invention.

The present invention provides for an indirect aggregator NAL unit, more generically a scalability information elementary data unit, for use in scalable video coding. The indirect aggregator NAL unit does not contain other NAL units. Instead, the indirect aggregator NAL unit of the present invention contains mechanisms for associating itself with other NAL units with it. These mechanisms include, but are not limited to, the number of succeeding bytes, the number of succeeding NAL units, and the number of remaining NAL units within higher level framing. For example, remaining NAL units within higher level framing are in the same RTP payload in which the indirect aggregator NAL unit also occurs.

The structure for the indirect NAL unit of the present invention further comprises property or characteristics information that is common to all associated NAL units. The common property or characteristics information includes, but is not limited to, the scalability information and whether the associated NAL units form a scalable layer switching point, at which a different scalable layer can switch to the current layer. The scalability information may include at least the "extended" NAL unit header specified in the SVC specification, including the simple_priority_id, discardable_flag, dependency_id, temporal_level, and quality_level syntax elements.

The indirect aggregator NAL unit of the present invention is selected from such NAL unit types that are specified as types that are to be ignored by the processing units for the H.264/AVC base layer only. In other words, the H.264/AVC decoder, AVC file format parser, and H.264/AVC RTP depay-loadizer should ignore the indirect aggregator NAL unit of the present invention. Furthermore, the indirect aggregator NAL unit may be ignored by the SVC decoder, as it causes no normative effect in the decoding process. An example syntax and semantics of the indirect aggregator NAL unit for the SVC file format, and another example for the SVC RTP payload format, are provided below. It should also be noted that the present invention is not limited to these particular examples of encapsulation and coding formats.

In terms of the SVC file format, aggregator NAL units enable the NALU-map-group entries to be consistent and repetitive. Aggregator NAL units are used to group SVC NAL units belonging to the same sample and having the same scalability information. Aggregator NAL units use the same header as scalable extension NAL units (SVC NAL units) but a new NAL unit type. An aggregator NAL unit may contain extractor NAL units. An extractor NAL unit may reference aggregator NAL units.

When scanning the stream, if the aggregator NALU is not needed (i.e. it belongs to an undesired layer), it and its contents are easily discarded (using its length field). If the aggregator NALU is needed, its header is easily discarded and its contents retained.

An aggregator NAL unit encapsulates two or more SVC NAL units into a new NAL unit. The aggregator NAL unit uses a NAL unit header with the same syntax as SVC NAL units (as specified in SVC specification). An aggregator NAL unit is stored within a sample like any other NAL unit.

All NAL units remain in decoding order within an aggregator NAL unit. If NAL units are grouped which belong to the same quality_level, then the order of NAL units with quality_level>0 may change. Syntax for the aggregator NAL unit is as follows.

```
class aligned(8) AggregatorNALUnit(AggregatorNALUnitSize) {
    unsigned int i = 2;
    /* NALUnitHeader as specified in the SVC spec */
    bit(1) forbidden_zero_bit;
    bit(2) NAL_ref_idc;
    bit(5) NAL_unit_type = AggregatorNALUnitType = const(30);
    bit(6) simple_dependency_ID;
    bit(1) discardable_flag;
    bit(1) extension_flag;
    if (extension_flag) {
            quality_level = simple_dependency_ID;
            bit (3) temporal_level;
            bit (3) dependency_ID;
            bit (2) quality_ID;
            i++;
    }
    /* end of NAL unit header */
    do {
            unsigned int((lengthSizeMinusOne+1)*8)
                    NALUnitLength;
            bit(NALUnitLength * 8) SVCNALUnit;
            i += (lengthSizeMinusOne+1)+NALUnitLength;
    } while (i<AggregatorNALUnitSize);
}
```

The semantics for an aggregator NAL unit are as follows.
NALUnitHeader: (8 or 16 bit) as specified in the SVC specification:
    NAL_unit type is set to the aggregator NAL unit type (type 30).
    Scalability information (NAL_ref_idc, simple_dependency_ID, discardable_flag, extended scalability information) shall have the same values as within the header of every aggregated NAL unit.
NALUnitLength: Specifies the size of the NAL unit following. The size of this field is specified with the lengthSizeMinusOne entry.

SVCNALUnit: SVC NAL unit as specified in the SVC specification, including the SVC NAL unit header. The size of the SVC NAL unit is specified by NALUnitLength.

It is assumed that an aggregator NAL unit collects SVC NAL units of the same scalability layer. It could group SVC NAL units of different layers as well (e.g. grouping of all quality levels (FGS fragments), grouping of all NAL units with the same dependency_ID). In this case, the aggregation NAL unit header would signal scalability information of SVC NAL units with the lowest dependency_ID and/or temporal_level, quality_ID.

Aggregator NAL units can be used to group SVC NAL units belonging to a level of scalability which may not be signalled by the NAL unit header (e.g. SVC NAL units belonging to a region of interest). The description of such aggregator NAL unit might be done with the layer description and the NAL unit map groups. In this case, more than one aggregator NAL unit with the same scalability information may occur in one sample.

Aggregator NAL units can lead to a constant number of NAL units for each layer in every AU. To ensure a constant pattern, the following could occur. The AVC base layer NALUs can be grouped in an aggregator NAL unit (if used in an SVC stream). In this case, temporal_level, dependency_ID and quality_ID are all set to 0. The AVC base layer NALUs can be referenced by an extractor NAL. If, for some reasons, no NALU of a particular layer exists in this AU, then an empty aggregator NAL units may exist at this position.

In terms of an RTP Payload Format for SVC Video, a Payload Content Scalability Information NAL Unit is generally as follows. An SVC NAL unit includes a header of one, two or three bytes and the payload byte string. The header indicates the type of the NAL unit, the (potential) presence of bit errors or syntax violations in the NAL unit payload, information regarding the relative importance of the NAL unit for the decoding process, and (optionally, when the header is of three bytes) the scalable layer decoding dependency information.

The NAL unit header co-serves as the payload header of this RTP payload format. The payload of a NAL unit follows immediately. The syntax and semantics of the NAL unit header are specified in [SVC], but the essential properties of the NAL unit header are summarized below.

The first byte of the NAL unit header has the following format:

```
+---------------+
|0|1|2|3|4|5|6|7|
+-+-+-+-+-+-+-+-+
|F|NRI|   Type  |
+---------------+
``` forbidden_zero_bit (F): 1 bit. The H.264 specification declares a value of 1 as a syntax violation.

nal_ref_idc (NRI): 2 bits. A value of 00 indicates that the content of the NAL unit is not used to reconstruct reference pictures for inter picture prediction. Such NAL units can be discarded without risking the integrity of the reference pictures in the same layer. Values greater than 00 indicate that the decoding of the NAL unit is required to maintain the integrity of the reference pictures. For a slice or slice data partitioning NAL unit, a NRI value of 11 indicates that the NAL unit contains data of a key picture, as specified in [SVC].

Informative Note: The concept of a key picture has been introduced in SVC, and no assumption should be made that any pictures in bit streams compliant with the 2003 and 2005 versions of H.264 follow this rule.

nal_unit_type (Type): 5 bits. This component specifies the NAL unit payload type. Previously, NAL unit types 20 and 21 (among others) have been reserved for future extensions. SVC is using these two NAL unit types. They indicate the presence of one more byte that is helpful from a transport viewpoint.

```
+---------------+
|0|1|2|3|4|5|6|7|
+-+-+-+-+-+-+-+-+
|   PRID    |D|E|
+---------------+
``` simple_priority_id (PRID): 6 bits. This component specifies a priority identifier for the NAL unit. When extension flag is equal to 0, simple_priority_id is used for inferring the values of dependency_id, temporal_level, and quality_level. When simple_priority_id is not present, it is inferred to be equal to 0.

discardable_flag (D): 1 bit. A value of 1 indicates that the content of the NAL unit (dependency_id=currDependencyId) is not used in the decoding process of NAL units with dependency_id>currDependencyId. Such NAL units can be discarded without risking the integrity of higher scalable layers with larger values of dependency_id. discardable_flag equal to 0 indicates that the decoding of the NAL unit is required to maintain the integrity of higher scalable layers with larger values of dependency_id.

extension_flag (E): 1 bit. A value of 1 indicates that the third byte of the NAL unit header is present. When the E-bit of the second byte is 1, then the NAL unit header extends to a third byte:

```
+---------------+
|0|1|2|3|4|5|6|7|
+-+-+-+-+-+-+-+-+
|  TL |  DID | QL|
+---------------+
``` temporal_level (TL): 3 bits. This component is used to indicate temporal scalability or frame rate. A layer consisted of pictures of a smaller temporal_level value has a smaller frame rate.

dependency_id (DID): 3 bits. This component is used to indicate the inter-layer coding dependency hierarchy. At any temporal location, a picture of a smaller dependency_id value may be used for inter-layer prediction for coding of a picture with a larger dependency_id value.

Quality_level (QL): 2 bits. This component is used to indicate FGS layer hierarchy. At any temporal location and with identical dependency_id value, an FGS picture with quality_level value equal to QL uses the FGS picture or base quality picture (the non-FGS picture when QL−1=0) with quality_level value equal to QL−1 for inter-layer prediction. When QL is larger than 0, the NAL unit contains an FGS slice or part thereof.

In this embodiment, a new NAL unit type, referred to as payload content scalability information (PACSI) NAL unit, is specified. The PACSI NAL unit, if present, must be the first NAL unit in aggregation packets, and it must not be present in other types of packets. The PACSI NAL unit indicates scalability characteristics that are common for all the remaining NAL units in the payload, thus making it easier for MANEs to decide whether to forward or discard the packet. Senders may create PACSI NAL units, and receivers can ignore them.

The NAL unit type for the PACSI NAL unit is selected among those values that are unspecified in the H.264/AVC specification and in RFC 3984. Thus, SVC streams having H.264/AVC base layer and including PACSI NAL units can be processed with RFC 3984 receivers and H.264/AVC decoders.

When the first aggregation unit of an aggregation packet contains a PACSI NAL unit, there must be at least one additional aggregation unit present in the same packet. The RTP header fields are set according to the remaining NAL units in the aggregation packet.

When a PACSI NAL unit is included in a multi-time aggregation packet, the decoding order number for the PACSI NAL unit must set to indicate that the PACSI NAL unit is the first NAL unit in decoding order among the NAL units in the aggregation packet or the PACSI NAL unit has an identical decoding order number to the first NAL unit in decoding order among the remaining NAL units in the aggregation packet.

The structure of PACSI NAL unit is specified as follows.

```
 0                   1                   2
 0 1 2 3 4 5 6 7 8 9 0 1 2 3 4 5 6 7 8 9 0 1 2 3
+-+-+-+-+-+-+-+-+-+-+-+-+-+-+-+-+-+-+-+-+-+-+-+-+
|F|NRI|  Type   |    PRID       |D|E| TL  | DID | QL|
+-+-+-+-+-+-+-+-+-+-+-+-+-+-+-+-+-+-+-+-+-+-+-+-+
```

The values of the fields in PACSI NAL unit must be set as follows.

The F bit must be set to 1 if the F bit in any remaining NAL unit in the payload is equal to 1. Otherwise, the F bit must be set to 0.

The NRI field must be set to the highest value of NRI field among the remaining NAL units in the payload.

The Type field must be set to 30.

The PRID field must be set to the lowest value of the PRID field among the remaining NAL units in the payload. If the PRID field is not present in one of the remaining NAL units in the payload, the PRID field in the PACSI NAL unit must be set to 0.

The D bit must be set to 0 if the D bit in any remaining NAL unit in the payload is equal to 0. Otherwise, the D bit must be set to 1.

The E bit must be set to 1.

The TL field must be set to the lowest value of the TL field among the remaining NAL units in the payload.

The DID field must be set to the lowest value of the DID field among the remaining NAL units in the payload.

The QL field must be set to the lowest value of the QL field among the remaining NAL units in the payload.

The indirect aggregator NAL unit of the present invention enables easy identification of scalability dependencies within the bitstream, thus enabling fast and efficient stream manipulation. The indirect aggregator NAL unit ensures that the base layer of the streams can still be processed with a H.264/AVC decoder, AVC file format parser, and H.264/AVC RTP payload parser.

In the case of decoding, it should be noted that the bitstream to be decoded can be received from a remote device located within virtually any type of network. Additionally, the bitstream can be received from local hardware or software. It should also be understood that, although text and examples contained herein may specifically describe an encoding process, one skilled in the art would readily understand that the same concepts and principles also apply to the corresponding decoding process and vice versa.

FIG. 1 shows one representative electronic device 12 within which the present invention may be implemented, both on the encoding side and the decoding side. It should be understood, however, that the present invention is not intended to be limited to one particular type of electronic device 12. The electronic device 12 of FIG. 1 includes a display 32, a keypad 34, a microphone 36, an ear-piece 38, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Figure 2:
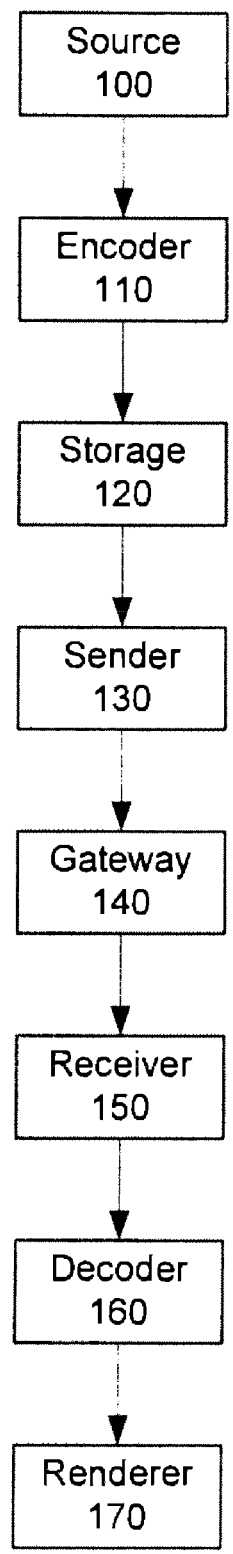
FIG. 2 shows a generic multimedia communications system for use with the present invention.

FIG. 2 shows a generic multimedia communications system for use with the present invention. A data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the server 130 may reside in the same physical device or they may be included in separate devices. The encoder 110 and server 130 may operate with live real-time content, in which case the coded media bitstream is typically not stored permanently, but rather buffered for small periods of time in the content encoder 110 and/or in the server 130 to smooth out variations in processing delay, transfer delay, and coded media bitrate.

The server 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server 130 encapsulates the coded media bitstream into packets. For example, when RTP is used, the server 130 encapsulates the coded media bitstream into RTP packets according to an RTP payload format. Typically, each media type has a dedicated RTP payload format. It should be again noted that a system may contain more than one server 130, but for the sake of simplicity, the following description only considers one server 130.

The server 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

The system includes one or more receivers 150, typically capable of receiving, de-modulating, and de-capsulating the transmitted signal into a coded media bitstream. The codec media bitstream is typically processed further by a decoder 160, whose output is one or more uncompressed media streams. Finally, a renderer 170 may reproduce the uncompressed media streams with a loudspeaker or a display, for example. The receiver 150, decoder 160, and renderer 170 may reside in the same physical device or they may be included in separate devices.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

Scalability can be used to improve error resilience in a transport system where layered coding is combined with transport prioritization. The term "transport prioritization" refers to various mechanisms to provide different qualities of service in transport, including unequal error protection, to provide different channels having different error/loss rates. Depending on their nature, data are assigned differently. For example, the base layer may be delivered through a channel with high degree of error protection, and the enhancement layers may be transmitted through more error-prone channels.

Figure 3:
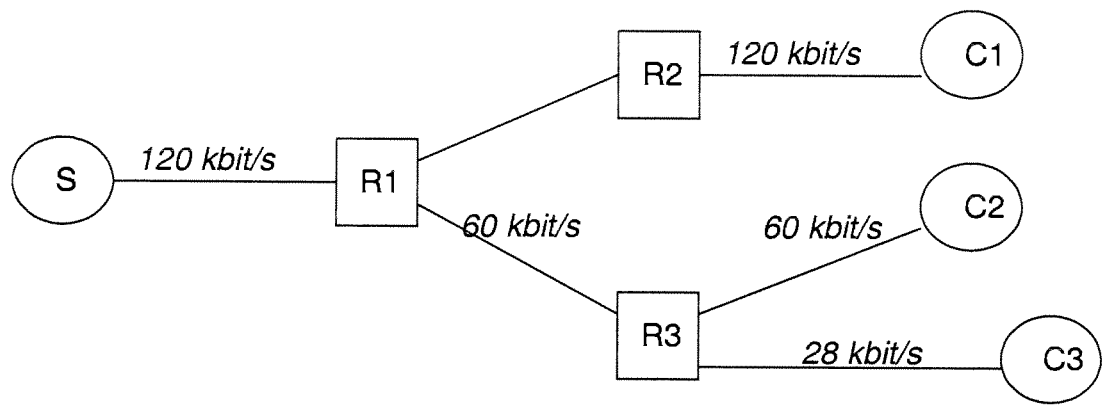
FIG. 3 shows an IP multicasting arrangement where each router can strip the bitstream according to its capabilities.

In multi-point and broadcast multimedia applications, constraints on network throughput may not be foreseen at the time of encoding. Thus, a scalable bitstream should be used. FIG. 3 shows an IP multicasting arrangement where each router can strip the bitstream according to its capabilities. FIG. 3 shows a server S providing a bitstream to a number of clients C1-C3. The bitstreams are routed to the clients by routers R1-R3. In this example, the server is providing a clip which can be scaled to at least three bit rates, 120 kbit/s, 60 kbit/s and 28 kbit/s.

If the client and server are connected via a normal unicast connection, the server may try to adjust the bit rate of the transmitted multimedia clip according to the temporary channel throughput. One solution is to use a layered bit stream and to adapt to bandwidth changes by varying the number of transmitted enhancement layers.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method for encapsulating a scalable coded video signal including a base layer of a coded picture and at least one enhancement layer of the coded picture, comprising:
    selecting at least one network abstraction layer (NAL) unit of the coded picture to be encapsulated into an aggregator NAL unit;
    generating a scalability information NAL unit associated with the at least one NAL unit, wherein the scalability information NAL unit is associated with one of:
    the at least one NAL unit; or
    a number of NAL units succeeding the scalability information NAL unit; and
    encapsulating the scalability information NAL unit and the at least one NAL unit into the aggregator NAL unit.

2. The method of claim 1, wherein, in response to the scalability information NAL unit being associated with a number of NAL units succeeding the scalability information NAL unit, the method further comprises generating an indication, wherein the indication is one of:
    a number of bytes succeeding the scalability information NAL unit, wherein the number of bytes encloses the number of NAL units; or
    the number of NAL units succeeding the scalability information NAL unit.

3. The method of claim 1, wherein the scalability information NAL unit is configured to be ignored during decapsulation.

4. The method of claim 1, wherein the scalability information is selected from the group consisting of a priority identifier for an NAL unit, temporal level, dependency order indicator, quality level, an indicator of whether NAL units associated with a higher dependency order indicator require the at least a portion of the associated NAL units for decoding, an indicator of whether the associated NAL units belong to a layer switching point wherein a different layer can switch to the current layer, and combinations thereof.

5. The method of claim 1, wherein the scalable coded video signal is encapsulated into a sequence of packets and the aggregator NAL unit is a packet payload.

6. The method of claim 5 wherein the sequence of packets comprises a real-time transport protocol (RTP) stream.

7. The method of claim 1, wherein the scalable coded video signal is encapsulated into at least one file according to the at least one file format, and the aggregator NAL unit is a sample according to the at least one file format.

8. The method of claim 7, further comprising:
generating the scalability information NAL unit associated with a first subset of the at least one NAL unit, the first subset comprising NAL units of the base layer of the coded picture; and
encapsulating a second subset of the at least one NAL unit into another aggregator NAL unit.

9. A non-transitory computer-readable medium comprising a computer program for encapsulating a scalable coded video signal including a base layer of a coded picture and at least one enhancement layer of the coded picture, the computer program comprising computer code for:
selecting at least one network abstraction layer (NAL) unit of the coded picture to be encapsulated into an aggregator NAL unit;
generating a scalability information NAL unit associated with the at least one NAL, unit, wherein the scalability information NAL unit is associated with one of:
the at least one NAL unit; or
a number of NAL units succeeding the scalability information NAL unit; and
encapsulating the scalability information NAL unit and the at least one NAL unit into the aggregator NAL unit.

10. The non-transitory computer-readable medium of claim 9, wherein the computer program comprises computer code for generating an indication in response to the scalability information NAL unit being associated with a number of NAL units succeeding the scalability information NAL unit, wherein the indication is one of:
a number of bytes succeeding the scalability information NAL unit, wherein the number of bytes encloses the number of NAL units; or
the number of NAL units succeeding the scalability information NAL unit.

11. The non-transitory computer-readable medium of claim 9, wherein the computer program comprises computer code for ignoring the scalability information NAL unit during decapsulation.

12. The non-transitory computer-readable medium of claim 9, wherein the scalability information is selected from the group consisting of a priority identifier for an NAL unit, temporal level, dependency order indicator, quality level, an indicator of whether NAL units associated with a higher dependency order indicator require the at least a portion of the associated NAL units for decoding, an indicator of whether the associated NAL units belong to a layer switching point wherein a different layer can switch to the current layer, and combinations thereof.

13. The non-transitory computer-readable medium of claim 9, wherein the scalable coded video signal is encapsulated into a sequence of packets and the aggregator NAL unit is a packet payload.

14. The non-transitory computer-readable medium of claim 9, wherein the scalable coded video signal is encapsulated into at least one file according to the at least one file format, and the aggregator NAL unit is a sample according to the at least one file format.

15. The non-transitory computer-readable medium of claim 14, wherein the computer program comprises computer code for:
generating the scalability information NAL unit associated with a first subset of the at least one NAL unit, the first subset comprising NAL units of the base layer of the coded picture; and
encapsulating a second subset of the at least one NAL unit into another aggregator NAL unit.

16. An electronic device for encapsulating a scalable coded video signal, comprising:
a processor; and a memory unit communicatively connected to the processor and including a computer program product for encapsulating a scalable coded video signal including a base layer of a coded picture and at least one enhancement layer of the coded picture, comprising:
computer code for selecting at least one network abstraction layer (NAL) unit of the coded picture to be encapsulated into an aggregator NAL unit;
computer code for generating a scalability information NAL unit associated with the at least one NAL unit wherein the scalability information NAL unit is associated with one of:
the at least one NAL unit; or
a number of NAL units succeeding the scalability information NAL unit; and
computer code for encapsulating the scalability information NAL unit and the at least one NAL unit into the aggregator NAL unit.

* * * * *